United States Patent

Lewanski et al.

Patent Number: 4,570,785
Date of Patent: Feb. 18, 1986

[54] YIELDABLE GRIPPER UNIT

[75] Inventors: Richard M. Lewanski, Chicago; Norman R. Buggele, LaGrange, both of Ill.

[73] Assignee: Sommer & Maca Industries, Inc., Chicago, Ill.

[21] Appl. No.: 646,945

[22] Filed: Sep. 4, 1984

[51] Int. Cl.[4] .............................................. B65G 15/14
[52] U.S. Cl. .................................... 198/628; 271/274
[58] Field of Search .............. 198/628, 697, 731, 732; 271/198, 272–275; 226/172

[56] References Cited

U.S. PATENT DOCUMENTS

| 1,568,047 | 1/1926 | Bisey | 226/172 X |
| 1,911,961 | 5/1933 | Melnick | 198/628 |
| 2,754,956 | 7/1956 | Sommer | 198/628 |
| 3,056,535 | 10/1962 | Baugh et al. | 226/172 |
| 3,756,589 | 9/1973 | Carbine | 271/274 |

FOREIGN PATENT DOCUMENTS

| 872726 | 4/1953 | Fed. Rep. of Germany | 271/274 |
| 1024096 | 2/1958 | Fed. Rep. of Germany | 271/274 |

Primary Examiner—Joseph E. Valenza
Assistant Examiner—Michael Stone
Attorney, Agent, or Firm—Kinzer, Plyer, Dorn & McEachran

[57] ABSTRACT

A yieldable gripper unit for a conveyor of the type in which the gripper units form two endless tracks which converge to engage and support a sheet of material clamped between them. The gripper units of the endless tracks move on rails mounted on tubular supports. One of the endless conveyor tracks is equipped with non-yielding gripper units and the other is equipped with yieldable gripper units. Each yieldable gripper unit includes a generally rectangular base plate having one side facing the sheet of material which is to be clamped and the other side facing its tubular supports. A yieldable arm is cantileverly attached to the base plate and is inclined at an acute angle relative to its base plate on the sheet material side thereof to permit the arm to yield towards the base plate when the sheet of material is clamped. A plurality of rubber buttons are mounted on the yieldable arm and are positioned to engage the sheet of material which is to be clamped by the gripper unit. The base plate has a track engaging device attached to the tubular support side thereof. The yieldable steel arm is inclined in a direction opposite to the direction of the movement of the gripper units around the endless track. In another embodiment, the yieldable arm is U-shaped having two legs, both of which can be moved toward its base plate to provide greater flexibility when clamping the sheet of material.

5 Claims, 6 Drawing Figures

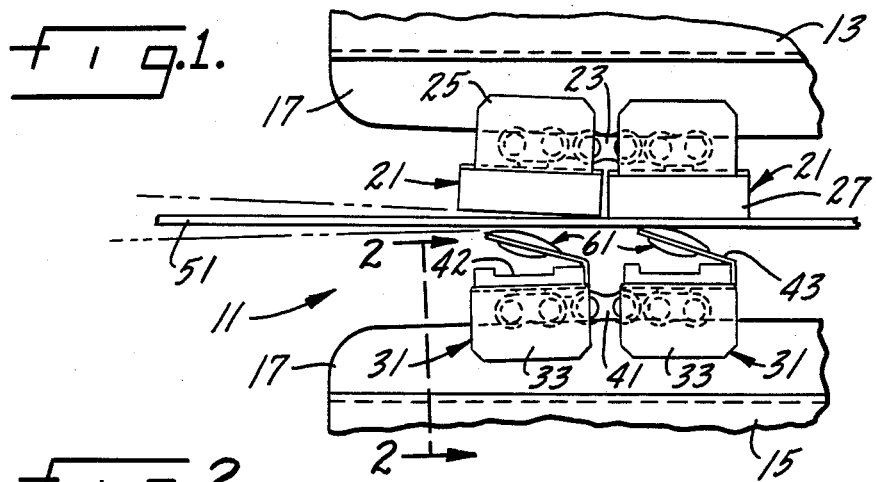
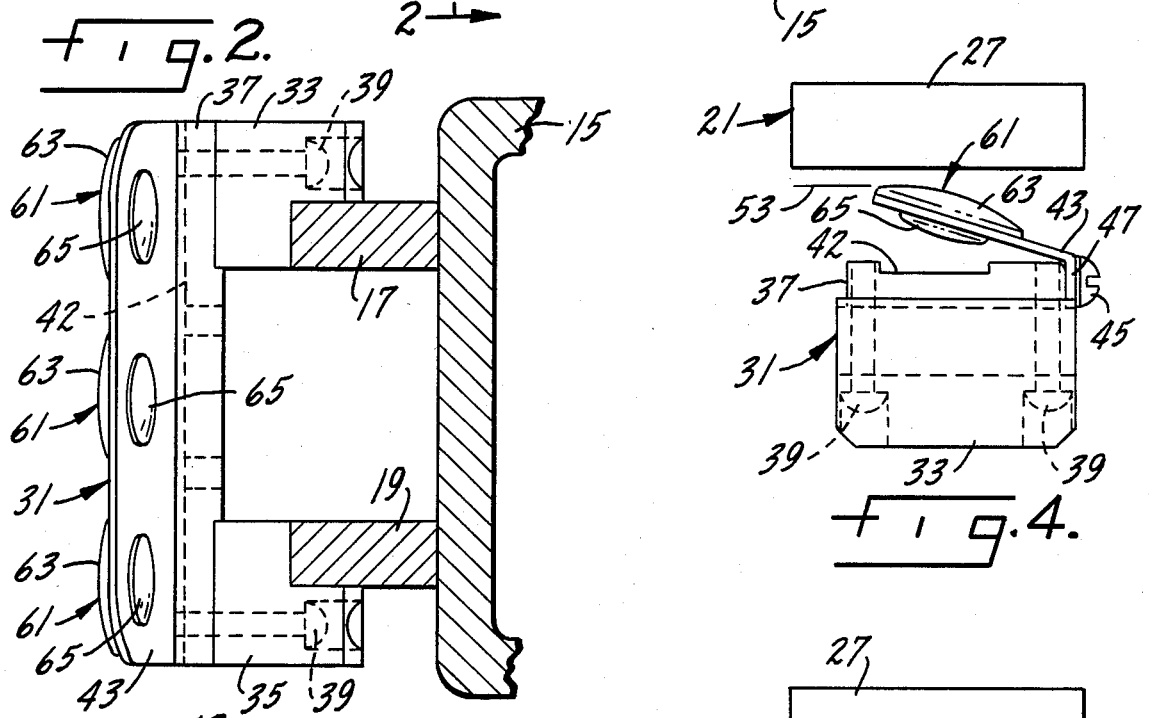
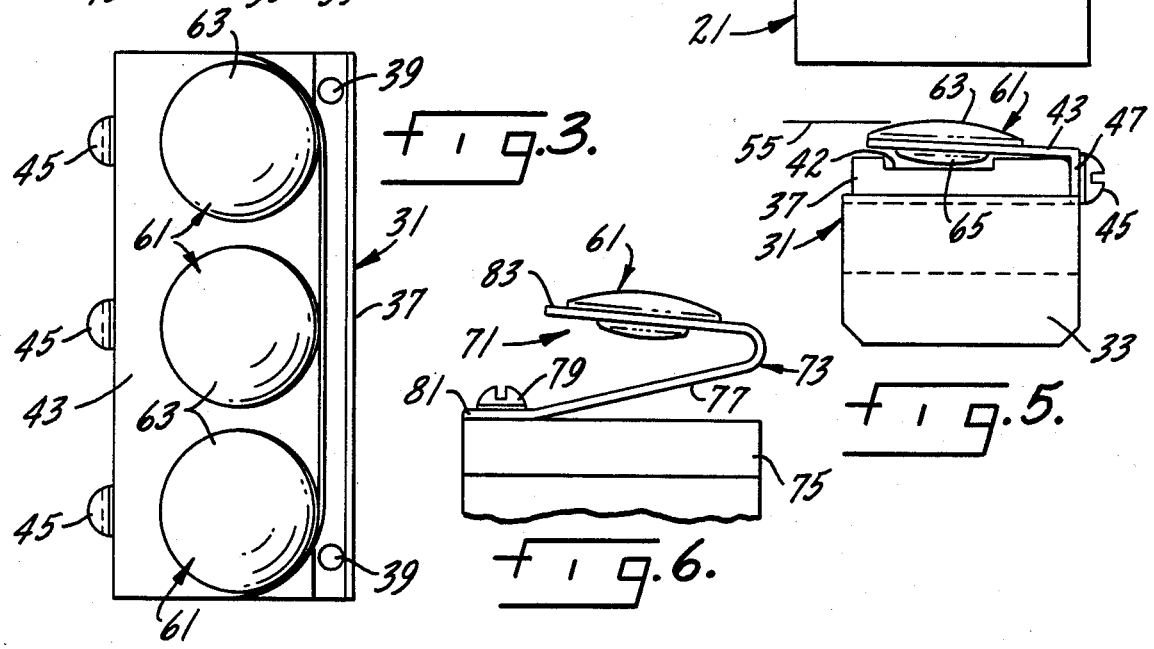

YIELDABLE GRIPPER UNIT

BACKGROUND AND SUMMARY OF THE INVENTION

This invention is concerned with a yieldable gripper unit for a conveyor of the type in which gripper units ride on rails and are pulled by chains to form two endless tracks which are positioned in opposed facing relationship. The endless tracks converge to engage and support a sheet of material which is clamped and transported between them. In such a unit, one of the endless conveyor tracks is equipped with non-yielding gripper units and the other is equipped with yieldable gripper units. This invention is concerned with the yieldable gripper units. Prior yieldable gripper units have included a rigid metallic plate or supporting block having a resilient surface in the form of a channel shaped pad of rubber or other yieldable material adhesively fastened thereto on the outer face thereof. Each of these gripper units was mounted on a pair of studs each of which was surrounded by a coil spring to provide yielding movement of the resilient surface covered supporting block. A gripper unit of this type is shown in U.S. Pat. No. 2,754,956, issued July 17, 1956.

A later improvement replaced the spring mounted supporting block with a molded rubber compression pad. However, it was difficult to control the range of yield of the molded rubber compression pad.

An object of this invention is a yieldable gripper unit in which the yieldability or resilience of the unit can be readily controlled.

Another object of this invention is a yieldable gripper unit which can be modified to handle different thicknesses of material.

Another object of this invention is a yieldable gripper unit in which the range of yieldability or resilience is greatly increased.

Another object of this invention is a flexible gripper unit that can be readily attached to and removed from a conveyor unit.

Other objects may be found in the following specification, claims and drawings.

BRIEF DESCRIPTION OF THE DRAWINGS

The invention is illustrated more or less diagrammatically in the following drawings wherein:

FIG. 1 is a partial plan view of a conveyor utilizing the yieldable gripper units of this invention with parts omitted and only selected portions of other parts shown for clarity of illustration;

FIG. 2 is a view taken along line 2—2 of FIG. 1 and shown on an enlarged scale;

FIG. 3 is a view taken from the left of FIG. 2 as viewed in the drawings;

FIG. 4 is a plan view of a gripper unit of this invention showing the arm arrangement for clamping a relatively thin sheet of material with parts omitted for clarity of illustration;

FIG. 5 is a view similar to FIG. 4 showing the gripper unit modified to clamp a relatively thick sheet of material; and FIG. 6 is a partial plan view of a modified form of yieldable gripper unit of this invention.

DESCRIPTION OF THE PREFERRED EMBODIMENTS

The yieldable gripper unit of this invention is intended for use on a conveyor structure of the type shown in U.S. Pat. No. 2,754,956. A conveyor of the type described in this patent may be used for transporting sheet material and particularly plate, float and sheet glass as a part of edging, beveling, seaming and polishing machines.

The conveyor 11 includes a pair of elongated stationary metallic conveyor guideways 13 and 15 which are generally square or rectangular in cross-section and are constructed from tubular pipe. An upper rail 17 and a lower rail 19 are attached to a side wall of each conveyor guideway 13 and 15. Non-yielding gripper units 21 are mounted on the tubular guideway 13 to travel on the upper and lower rails 17 and 19 under the pulling force of a chain 23. Only two of the gripper units 21 and a portion of the chain 23 are shown in FIG. 1 of the drawings for clarity of illustration but it should be understood that a sufficient number of gripper units are provided to form an endless track around the conveyor guideway 13. The gripper unit 21 has upper and lower guide shoes which ride on the rails 17 and 19. Only upper guide shoe 25 is shown in the drawings for clarity of illustration. These guide shoes are manufactured from an ultrahigh wear resistant plastic and are similar to the guide shoes for the yielding gripper unit which will be described hereinafter. Each of the non-yielding gripper units 21 may have a resilient gripping pad 27 which is adhesively or otherwise attached to a metallic rigid supporting block but the details of this gripper unit are not shown since they do not form a part of this invention. Reference is made to U.S. Pat. No. 2,754,956 for a detailed description of such a unit.

An endless track of yielding gripper units 31 are mounted on the upper and lower rails 17 and 19 of the conveyor guide 15 of the invention. Although not shown, a sufficient number of gripper units are provided to form an endless track around the conveyor guideway 15. Each yielding gripper unit 31 has an upper guide shoe 33 and a lower guide shoe 35 which are notched to enable them to ride in contact with a side and end surface respectively of the rails 17 and 19 in the manner shown in FIG. 2 of the drawings. The guide shoes 33 and 35 are made of an ultrahigh mechanical wear plastic and are attached to the gripper base plate 37, which may be formed of aluminum, by threaded fasteners 39. As most clearly shown in FIG. 1 of the drawings, the yielding gripper units 31 are moved on the rails 17 and 19 by a chain 41, only a portion of which is shown in the drawings. The chain is omitted for clarity of illustration from the drawing of FIG. 2 but it would be located in the space between the upper and lower guide shoes 33 and 35 and the rails and attached to the gripper base plate 37. A shallow rectangular groove 42 is formed in the surface of the gripper base plate 37 which faces away from its tubular supporting guide 15.

A thin, rectangular plate of hardened stainless steel is formed into a yieldable arm 43 which is attached to the gripper base 37 by screws 45 which, in this embodiment, extend through a bent portion 47 of the plate and into threaded openings in the edge of the gripper base plate 37. The angle between the bent portion 47 of the plate and the yieldable arm 43 determines the angle of inclination of the arm to the base plate 37 and also its angle of inclination to the piece of sheet material 51 which is being clamped between the gripper units 21 and 31 of the conveyor. Note that the arm 43 is inclined in a direction away from the direction of movement of the endless track in which it is installed. For example, FIG. 4 shows the angle of the arm 43 when clamping an extremely thin sheet 51 of material, the thickness of which is indicated by the line 53, while FIG. 5 shows the angle of inclination assumed by the arm 43 for clamping an extremely thick piece of material indicated by the line 55. For clamping sheets of material having thicknesses in between those shown in FIGS. 4 and 5, the angle between the bent portion and the arm portion of the plate will be varied accordingly.

Mounted along the length of the arm 43 in a direction extending transverse of the movement of the yielding gripper unit 31 relative to the conveyor guide 15 are a series of synthetic rubber buttons 61 which are inserted in openings (not shown) in the arm 43. Each rubber button has a flattened hemispherical head 63 which faces the sheet material which is clamped, a stem (not shown) which extends through an opening in the arm and a protrusion 65 which engages the opposite side of the arm to hold the button on the arm. The protrusion 65 is forced through the opening and then expands to engage the underside of the arm around the opening to hold the button in place. Synthetic rubber buttons 61 are stock items readily available from rubber supply houses and may be purchased in various sizes. It should be noted that the shallow rectangular groove 42 which is formed in the gripper base plate 37 receives the protrusion 65 of the button as shown in FIG. 5 when the angle of inclination of the arm 43 relative to the gripper base plate 37 is relatively small such as occurs when thick sheets 51 of material are being handled.

FIG. 6 of the drawings shows a modified form of yielding gripper unit 71 which provides greater flexibility when handling thicker pieces of sheet material 51. In this modification, the yieldable arm 73 is U-shaped, having two legs, both of which can flex towards its base plate 75 which like base plate 37 is preferably made of aluminum. The U-shaped arm 73 has a first leg 77 which is fastened to the base plate 75 by screws 79 passing through a tip portion 81 of the leg. The remainder of the leg 77 is bent at an angle to the tip so that it extends from the base at an acute angle. The other leg 83 of the U-shaped member is bent so it is substantially parallel to the base plate 75 and it carries the synthetic rubber button 61. The construction of the yieldable arm 73 allows both legs 77 and 83 to flex under load, thereby providing a greater range of flexibility.

Whereas the preferred forms of the invention have been shown and described, it should be understood that there are modifications, alterations and changes which may be made without departing from the teachings of the invention. Therefore, the scope of the invention should only be limited by the language of the claims attached hereto.

We claim:

1. A yieldable gripper unit for a conveyor of the type in which gripper units forming endless tracks of two conveyor mechanisms which converge to engage and support a sheet of material clamped between them, in which the gripper units of the endless tracks move on rails mounted on tubular supports, and in which one of the endless conveyor tracks is equipped with non-yielding gripper units and the other is equipped with yieldable gripper units, the yieldable gripper unit including:
a generally rectangular base plate having one side facing the sheet of material which is to be clamped and the other side facing its tubular supports,
a yieldable arm cantileverly attached to the base plate and inclined at an acute angle thereto on the sheet material side thereof to permit the arm to yield towards the base plate when the sheet of material is clamped,
a plurality of rubber buttons mounted on the yieldable arm and positioned to contact the sheet of material to be clamped by the gripper unit, and
track engaging means attached to the tubular support side of the base plate.

2. The yieldable gripper unit of claim 1 in which the yieldable arm is U-shaped having two legs both of which can be moved towards the base plate to provide greater flexibility when clamping the sheet of material.

3. The yieldable gripper unit of claim 1 in which the yieldable arm is inclined in a direction opposite to the direction of movement of the gripper unit around the endless track.

4. The gripping unit of claim 1 in which the rubber buttons each have hemispherical heads on one side of the arm which heads engage the sheet of material being clamped.

5. The gripper unit of claim 4 in which the rubber buttons are seated in openings formed in the yieldable arm with each button having a disk shaped fastening portion and a stem formed integrally with the hemispherical head, the stem extending through the opening in the arm and the fastening disk projecting beyond the opening to engage the arm on the side of the arm opposite to that engaged by the hemispherical head to secure the button to the arm.

* * * * *